United States Patent
Malcolm

(10) Patent No.: US 6,661,308 B2
(45) Date of Patent: Dec. 9, 2003

(54) ONE-BY-N SWITCH MATRIX

(75) Inventor: Bruce G. Malcolm, Fishers, IN (US)

(73) Assignee: Trilithic, Inc., Indianapolis, IN (US)

( * ) Notice: Subject to any disclaimer, the term of this patent is extended or adjusted under 35 U.S.C. 154(b) by 0 days.

(21) Appl. No.: 10/204,238

(22) PCT Filed: Feb. 5, 2001

(86) PCT No.: PCT/US01/03645
§ 371 (c)(1),
(2), (4) Date: Aug. 19, 2002

(87) PCT Pub. No.: WO01/63961
PCT Pub. Date: Aug. 30, 2001

(65) Prior Publication Data
US 2002/0195881 A1 Dec. 26, 2002

Related U.S. Application Data

(60) Provisional application No. 60/183,931, filed on Feb. 22, 2000, and provisional application No. 60/200,845, filed on May 1, 2000.

(51) Int. Cl.[7] ............................. H01P 1/10; H01H 19/64
(52) U.S. Cl. .................. 333/101; 307/113; 307/115; 333/103; 333/105
(58) Field of Search .................. 333/101–108; 307/113, 115

(56) References Cited

U.S. PATENT DOCUMENTS

| 4,211,894 | A | * | 7/1980 | Watanabe et al. | 370/339 |
|---|---|---|---|---|---|
| 4,349,795 | A | | 9/1982 | Kwok | 333/176 |
| 5,285,202 | A | | 2/1994 | Cooperman et al. | 340/825.8 |
| 5,872,481 | A | | 2/1999 | Sevic et al. | 330/51 |
| 5,892,864 | A | * | 4/1999 | Stoll et al. | 385/17 |

FOREIGN PATENT DOCUMENTS

GB 2 259 621 3/1993

* cited by examiner

Primary Examiner—Barbara Summons
(74) Attorney, Agent, or Firm—Barnes & Thornburg

(57) ABSTRACT

A 1-by-N switch matrix (10) includes at least two ranks of switches (12-1, 12-2-1, 12-2-2, 12-3-1, . . . , 12-3-4, 12-4-1, . . . , 12-4-8, and 12-5-1, . . . , 12-5-16; 112-1, 112-2-1, 112-2-2, 112-3-1, . . . , 112-3-4, 112-4-1, . . . , 112-4-8, and 112-5-1, . . . , 112-5-8). Each switch has first, second and third terminals (1, 2, 3). A first state of each switch couples the first terminal (1) to the second terminal (2) and a second state of each switch couples the first terminal (1) to the third terminal (3). The second (2) and third (3) terminals of each switch (12-1, 12-2-1, 12-2-2, 12-3-1, . . . 1., 2-3-4; 112-1, 112-2-1, 112-3-3 and 112-3-4) of each rank (-1-, -2-, -3-) above the next to lowest rank (-4- or -3-) are coupled to first terminals (1) of respective switches (12-4-1, . . . , 12-4-8 and 112-3-1, 112-3-2, 112-4-5, 112-4-8) in the next lower rank (-2-, -3-, -4-). The second (2) and third (3) terminals of each switch (12-4-1, 12-4-8 and 112-3-1, 112-3-2, 112-4-5, . . . , 112-4-8) in the next to lowest rank (-4- or -3-) are coupled to the second terminals (2) of respective switches (12-5-1, 12-5-16; 112-4-1, 112-4-4 and 112-5-1, . . . , 112-5-8) in the lowest rank (-5- or -4-). The first terminals (1) of the switches (12-5-1, . . . , 12-5-16; 112-4-1, . . . , 112-4-4 and 112-5-1, . . . , 112-5-8) in the lowest rank (-5- or -4-) are coupled to switch matrix utilization devices (14-1, . . . , 14-16 and 114-1, . . . , 114-12). The third terminals (3) of the switches (12-5-1, . . . , 12-5-16; 112-4-1, . . . , 112-4-4 and 112-5-1, . . . , 112-5-8) in the lowest rank (-5- or -4-) are coupled to respective dummy loads.

8 Claims, 3 Drawing Sheets

ONE-BY-N SWITCH MATRIX

This application is a 371 of PCT/US01/03645 filed Feb. 5, 2001 which claims the benefit of 60/183,931 filed Feb. 22, 2000 and claims benefit of 60/200,845 filed May 1, 2000.

FIELD OF THE INVENTION

This invention relates to switch matrices. It is disclosed in the context of a non-blocking matrix switch for radio frequency (RF) and/or microwave applications, but is believed to be useful in other applications as well.

DISCLOSURE OF THE INVENTION

According to one aspect of the invention, a 1-by-N switch matrix includes at least two ranks of switches. Each switch has first, second and third terminals. A first state of each switch couples the first terminal to the second terminal and a second state of each switch couples the first terminal to the third terminal. The second and third terminals of each switch of each rank above the next to lowest rank are coupled to first terminals of respective switches in the next lower rank. The second and third terminals of each switch in the next to lowest rank are coupled to the second terminals of respective switches in the lowest rank. The first terminals of the switches in the lowest rank are coupled to switch matrix utilization devices. The third terminals of the switches in the lowest rank are coupled to respective dummy loads.

Illustratively according to this aspect of the invention, the 1-by-N switch matrix further includes separate Faraday cylinders for isolating the joined second terminals of each switch in the next to lowest rank and the second terminals of respective switches in the lowest rank, separate Faraday cylinders for isolating the joined third terminals of each switch in the next to lowest rank and the second terminals of respective switches in the lowest rank, and separate Faraday cylinders for isolating the third terminals of the switches in the lowest rank and their respective dummy loads.

According to another aspect of the invention, a 1-by-N switch matrix includes at least two ranks of switches. Each switch has first, second and third terminals. A first state of each switch couples the first terminal to the second terminal and a second state of each switch couples the first terminal to the third terminal. Second and third terminals of each switch in the next to highest rank are coupled to the second terminals of respective switches in the highest rank. The first terminals of the switches in the highest rank are coupled to switch matrix utilization devices. The third terminals of the switches in the highest rank are coupled to respective dummy loads.

Illustratively according to this aspect of the invention, the 1-by-N switch further includes separate Faraday cylinders for isolating the joined second terminals of each switch in the next to highest rank and the second terminals of respective switches in the highest rank, separate Faraday cylinders for isolating the joined third terminals of each switch in the next to highest rank and the second terminals of respective switches in the highest rank, and separate Faraday cylinders for isolating the third terminals of the switches in the highest rank and their respective dummy loads.

Illustratively according to the invention, the switches are RF switches.

Further illustratively according to the invention, the switches are microwave switches.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
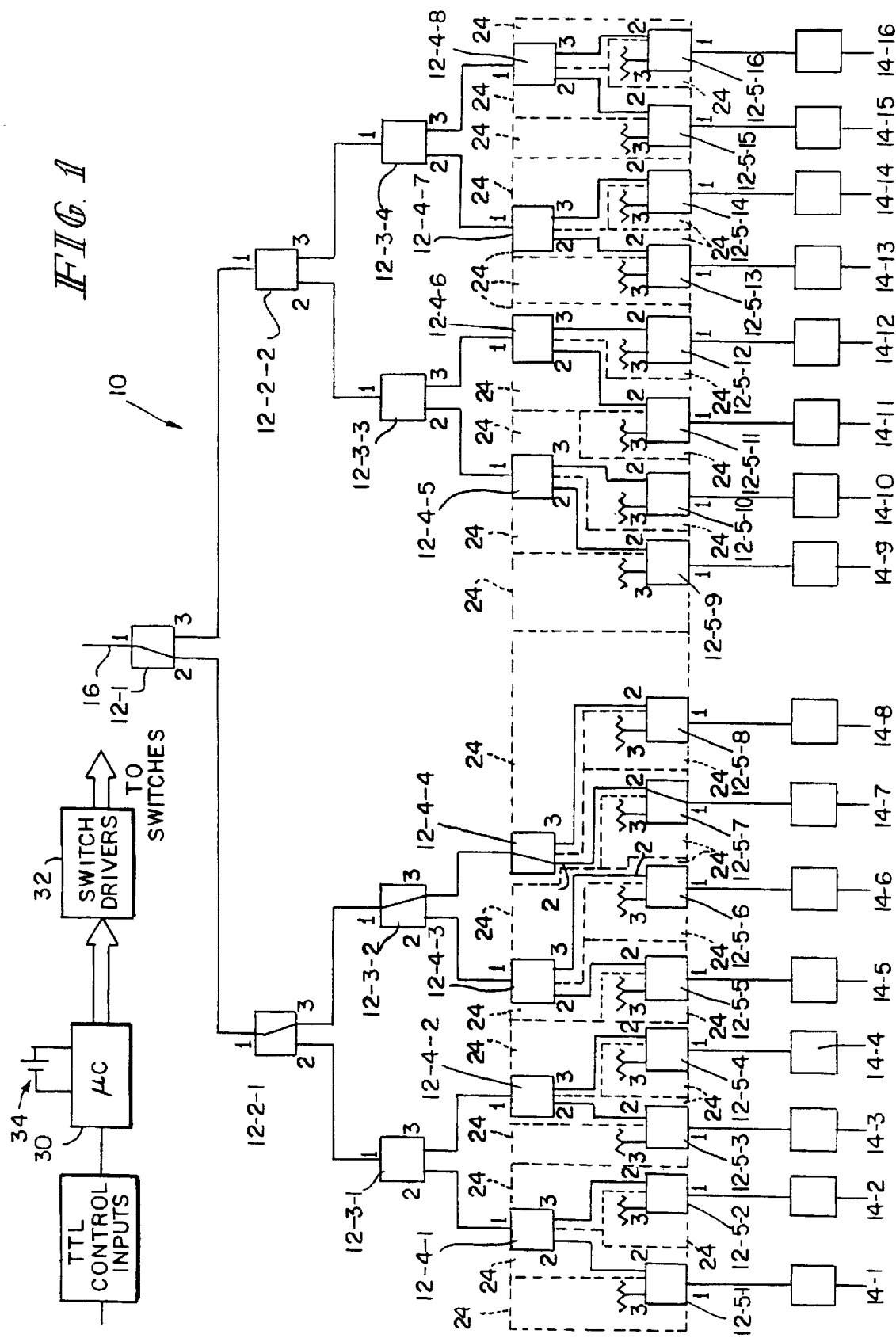
FIG. 1 illustrates a block diagram of an embodiment of the invention.

Referring now to FIG. 1, a 1-by-N switch matrix 10 includes a number, illustratively five, ranks of single pole, double throw, latching relays (hereinafter sometimes switches) 12-1, 12-2-1, 12-2-2, 12-3-1, . . . 12-3-4, 12-4-1, . . . 12-4-8, and 12-5-1, . . . 12-5-16. Each switch 12-1, 12-2-1, 12-2-2, 12-3-1, . . . 12-3-4, 12-4-1, . . . 12-4-8, and 12-5-1, . . . 12-5-16 has first, second and third terminals, 1, 2 and 3, respectively. A first state of each switch 12-1, 12-2-1, 12-2-2, 12-3-1, . . . 12-3-4, 12-4-1, . . . 12-4-8, and 12-5-1, . . . 12-5-16 couples the first terminal, 1, of that switch 12-1, 12--1, 12-2-2, 12-3-1, . . . 12-3-4, 12-4-1, . . . 12-4-8, and 12-5-1, . . . 12-5-16 to the second terminal, 2, of the switch 12-1, 12-2-1, 12-2-2, 12-3-1, . . . 12-3-4, 12-4-1, . . . 12-4-8, and 12-5-1, . . . 12-5-16. This is illustrated diagrammatically in switches 12-1, 12-4-4 and 12-5-7.

A second state of each switch 12-1, 12-2-1, 12-2-2, 12-3-1, . . . 12-3-4, 12-4-1, . . . 12-4-8, and 12-5-1, . . . 12-5-16 couples the first terminal, 1, of the switch 12-1, 12-2-1, 12-2-2, 12-3-1, . . . 12-3-4, 12-4-1, . . . 12-4-8, and 12-5-1, . . . 12-5-16 to the third terminal, 3, of the switch 12-1, 12-2-1, 12-2-2, 12-3-1, . . . 12-3-4, 12-4-1, . . . 12-4-8, and 12-5-1, . . . 12-5-16. This is illustrated diagrammatically in switches 12-2-1, 12-3-2. Also, all the switches in rank five except switch 12-5-7 are in this second state. The positions of switches which are not in the signal path, based upon the positions of switches of higher rank, are not illustrated. This convention, which simplifies the drawings, is generally observed throughout this description.

The second and third terminals, 2, 3, respectively, of each switch 12-1, 12-2-1, 12-2-2, and 12-3-1, . . . 12-3-4 of each rank above the next to lowest rank (the fourth rank in this embodiment) are coupled to first terminals, 1, of respective switches in the next lower rank. The second and third terminals, 2, 3, respectively, of each switch 12-4-1, . . . 12-4-8 in the next to lowest rank (again, the fourth rank in this example) are coupled to the second terminals, 2, of respective switches 12-5-1, . . . 12-5-16 in the lowest rank (the fifth in this example). The first terminals, 1, of the switches 12-5-1, . . . 12-5-16 in the lowest rank are coupled to switch matrix utilization devices 14-1, 14-2, . . . 14-16, respectively, which utilize the switch matrix 10 for distribution of a signal from an input terminal 16, the first terminal, 1, of switch 12-1 in the first rank, to an output terminal 18, the first terminal, 1, of switch 12-5-7 in the fifth rank.

The third terminals 3 of the switches 12-5-1, . . . 12-5-16 in the lowest (the fifth in this embodiment) rank are coupled to respective dummy loads or attenuator pads 22. The attenuator pads provide, for example, 70 dB of internal attenuation on terminals 3 of switches 12-5-1, . . . 12-5-16. Illustratively, the switches 12-1, 12-2-1, 12-2-2, 12-3-1, . . . 12-3-4, 12-4-1, . . . 12-4-8, and 12-5-1, . . . 12-5-16 are RF or microwave relays, such as, for example, model IP2T pulse latching relays available from RelCom Technologies, Inc., for switching the input at terminal 16 among the outputs at terminals 1 of switches 12-5-1, . . . 12-5-16 as commanded by electrical multiplexing signals supplied from a source, not shown, to actuating terminals, not shown, of switches 12-1, 12-2-1, 12-2-2, 12-3-1, . . . 12-3-4, 12-4-1, . . . 12-4-8, and 12-5-1, . . . 12-5-16 which cause the switches 12-1, 12-2-1, 12-2-2, 12-3-1, . . . 12-3-4, 12-4-1, . . . 12-4-8, and 12-5-1, . . . 12-5-16 to switch from their first states to their second states. Such relays are capable of handling frequencies in the range of, for example, 1 GHz-2.5 GHz.

Each terminal 2, 3 of each switch 12-4-1, . . . 12-4-8, 12-5-1, . . . 12-5-16 in the second to the lowest rank and the lowest rank (again, the fourth and fifth ranks in the embodiment illustrated in FIG. 1) is further enclosed in a separate, continuous Faraday cylinder 24 which includes at least some portion of the switch 12-4-1, . . . 12-4-8, 12-5-1, . . . 12-5-16 housing. This is illustrated by the broken lines in the drawings. The Faraday cylinder 24 containing the third terminal, 3, of each switch 12-5-1, . . . 12-5-16 in the lowest rank also houses that terminal's associated attenuator pad 22. This reduces the possibility of crosstalk among the terminals 1, 2, 3 of the various switches at the high frequencies which are being handled by the switches. Isolations of, for example, 70 dB or greater may thus be maintained between the terminals 1, 2 and 2, 3 and 1, 3 of each switch 12-4-1, . . . 12-4-8, 12-5-1, . . . 12-5-16 whose terminals 1, 2, 3 are thus isolated in separate Faraday cylinders 24. The Faraday cylinders are not illustrated in FIGS. 2-3, again, for the purpose of simplifying the drawings.

Figure 2:
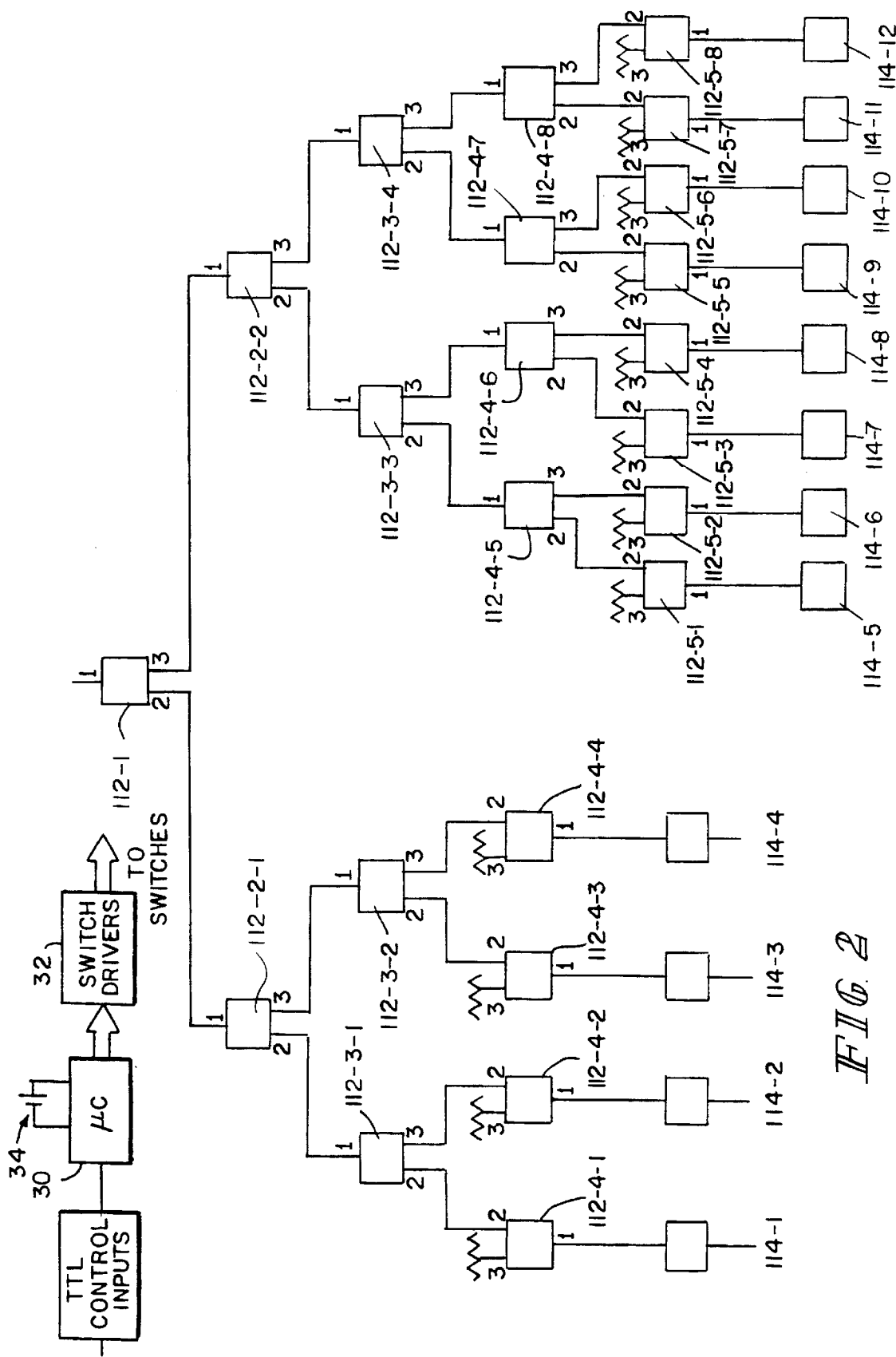
FIG. 2 illustrates a block diagram of another embodiment of the invention.

The lowest ranks do not need to be the same in each branch of a switch. This is best illustrated in FIG. 2 wherein, instead of having sixteen utilization devices 14-1, 14-2, . . . 14-16, there are only twelve, 114-1, 114-2, . . . 114-12. In this embodiment, the lowest rank of switches 112-4-1, 112-4-2, 112-4-3, 112-4-4 in the branch off terminal 2 of the switch 112-1 in the first rank is the fourth, while the lowest rank of switches 112-5-1, 112-52, . . . 112-5-8 off terminal 3 of switch 112-1 is the fifth.

Figure 3:
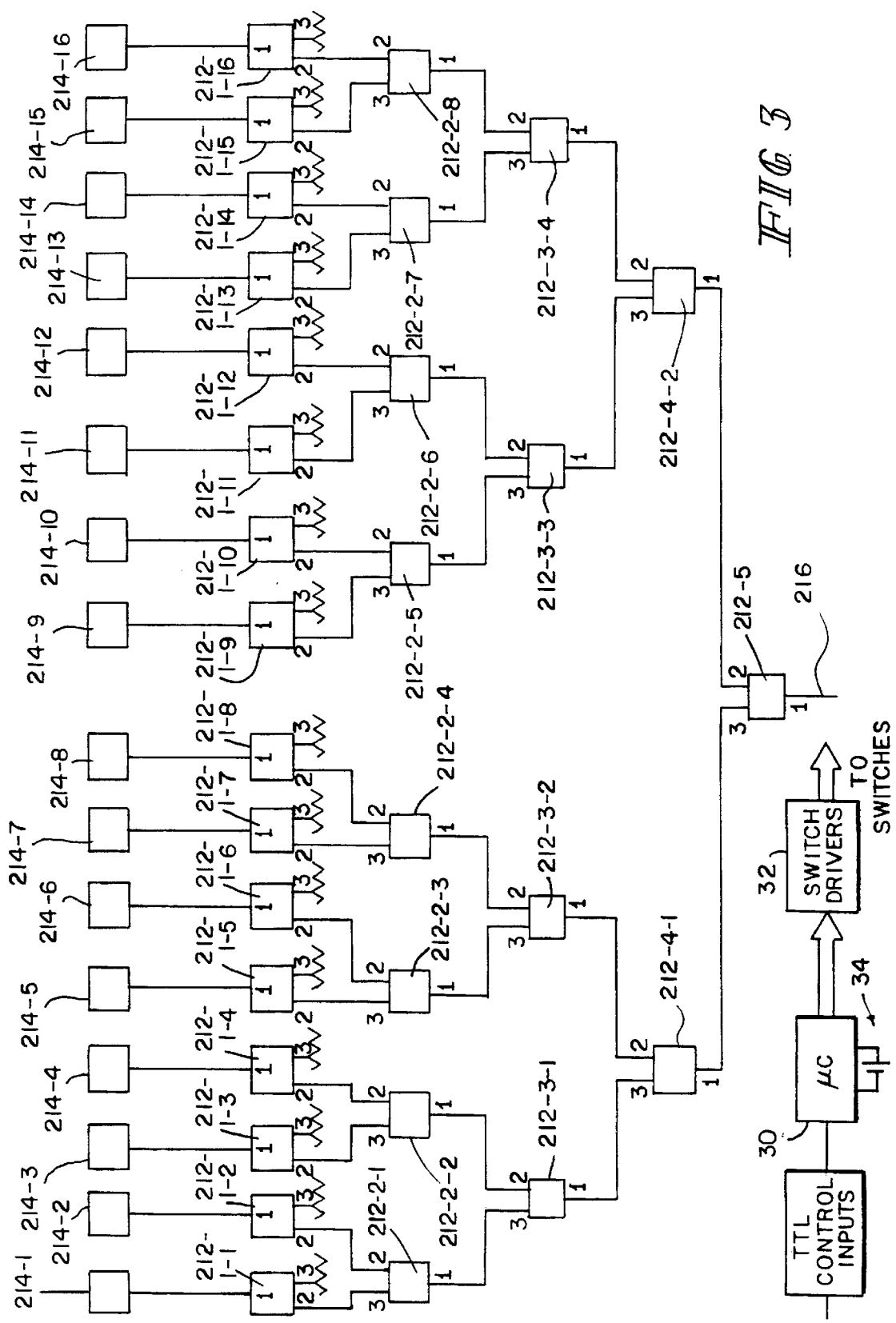
FIG. 3 illustrates a block diagram of another embodiment of the invention.

The matrix may also be operated, for example, to time-division multiplex several different inputs into a single output. This is illustrated in FIG. 3. In this embodiment, the input signals are provided by the utilization devices 214-1, 214-2, . . . 214-16 on terminals 1 of the respective switches 212-1-1, 212-1-16 in the first rank, and the output appears at output terminal 216, the first terminal 1 of switch 212-5.

What is claimed is:

1. A 1-by-N switch matrix including at least two ranks of switches, each switch having first, second and third terminals, a first state of each switch coupling the first terminal to the second terminal and a second state of each switch coupling the first terminal to the third terminal, second and third terminals of each switch of each rank above the next to lowest rank being coupled to first terminals of respective switches in the next lower rank, the second and third terminals of each switch in the next to lowest rank being coupled to the second terminals of respective switches in the lowest rank, the first terminals of the switches in the lowest rank being coupled to switch matrix utilization devices, and the third terminals of the switches in the lowest rank being coupled to respective dummy loads.

2. The apparatus of claim 1 further including separate Faraday cylinders for isolating the joined second terminals of each switch in the next to lowest rank and the second terminals of respective switches in the lowest rank, separate Faraday cylinders for isolating the joined third terminals of each switch in the next to lowest rank and the second terminals of respective switches in the lowest rank, and separate Faraday cylinders for isolating the third terminals of the switches in the lowest rank and their respective dummy loads.

3. The apparatus of claim 1 wherein the switches are RF switches.

4. The apparatus of claim 1 wherein the switches are microwave switches.

5. A 1-by-N switch matrix including at least two ranks of switches, each switch having first, second and third terminals, a first state of each switch coupling the first terminal to the second terminal and a second state of each switch coupling the first terminal to the third terminal, second and third terminals of each switch in the next to highest rank being coupled to the second terminals of respective switches in the highest rank, the first terminals of the switches in the highest rank being coupled to switch matrix utilization devices, and the third terminals of the switches in the highest rank being coupled to respective dummy loads.

6. The apparatus of claim 5 further including separate Faraday cylinders for isolating the joined second terminals of each switch in the next to highest rank and the second terminals of respective switches in the highest rank, separate Faraday cylinders for isolating the joined third terminals of each switch in the next to highest rank and the second terminals of respective switches in the highest rank, and separate Faraday cylinders for isolating the third terminals of the switches in the highest rank and their respective dummy loads.

7. The apparatus of claim 5 wherein the switches are RF switches.

8. The apparatus of claim 5 wherein the switches are microwave switches.

* * * * *